United States Patent
Papasakellariou et al.

(10) Patent No.: US 9,930,665 B2
(45) Date of Patent: *Mar. 27, 2018

(54) CONTROL SIGNALING FOR TRANSMISSIONS OVER CONTIGUOUS AND NON-CONTIGUOUS FREQUENCY BANDS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR); Ju-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 247 days.

This patent is subject to a terminal disclaimer.

(21) Appl. No.: 14/745,953

(22) Filed: Jun. 22, 2015

(65) Prior Publication Data

US 2015/0289274 A1    Oct. 8, 2015

Related U.S. Application Data

(63) Continuation of application No. 13/421,192, filed on Mar. 15, 2012, now Pat. No. 9,065,592, which is a
(Continued)

(51) Int. Cl.
*H04W 72/04* (2009.01)
*H04L 5/00* (2006.01)
(Continued)

(52) U.S. Cl.
CPC ........ *H04W 72/0453* (2013.01); *H04B 1/713* (2013.01); *H04L 1/1893* (2013.01);
(Continued)

(58) Field of Classification Search
None
See application file for complete search history.

(56) References Cited

U.S. PATENT DOCUMENTS 6,064,662 A    5/2000   Gitlin et al.
7,756,087 B2   7/2010   Kim et al.
(Continued)

FOREIGN PATENT DOCUMENTS

CN    1347254    5/2002
CN    1849011    10/2006
(Continued)

OTHER PUBLICATIONS

MCC Support, Draft Report of 3GPP TSG RAN WG1 #51 V1.0.0, R1-080002, 3GPP TSG RAN WG1 Meeting #51b, Jan. 14-18, 2008, 69 pages.
(Continued)

*Primary Examiner* — Donald Mills
(74) *Attorney, Agent, or Firm* — The Farrell Law Firm, P.C.

(57) ABSTRACT

Methods and apparatuses are provided for communication between a UE and a Node B in a communication system. The UE receives a control signal including one bit of frequency hopping information, a resource allocation type, a resource allocation, and a cyclic shift for a reference signal from the Node B. It is determined that the frequency hopping information is used as a part of resource allocation information, if the resource allocation type indicates that two sets of resource blocks are allocated. The UE transmits data based on the frequency hopping information, the resource allocation type, and the resource allocation included in the control signal. Each of the resource blocks comprises one or more resource block groups, and a size of each resource block group is determined based on an uplink bandwidth.

8 Claims, 15 Drawing Sheets

Related U.S. Application Data continuation of application No. 12/697,815, filed on Feb. 1, 2010, now Pat. No. 8,160,016.

(60) Provisional application No. 61/148,682, filed on Jan. 30, 2009.

(51) Int. Cl.
| | | |
|---|---|---|
| *H04B 1/713* | (2011.01) | |
| *H04W 72/12* | (2009.01) | |
| *H04L 1/18* | (2006.01) | |

(52) U.S. Cl.
CPC .............. *H04L 5/00* (2013.01); *H04L 5/0012* (2013.01); *H04L 5/0023* (2013.01); *H04L 5/0048* (2013.01); *H04L 5/0053* (2013.01); *H04W 72/12* (2013.01); *H04L 1/1812* (2013.01); *H04L 5/0046* (2013.01); *H04W 72/1268* (2013.01); *H04W 72/1289* (2013.01)

(56) References Cited

U.S. PATENT DOCUMENTS

| | | | |
|---|---|---|---|
| 7,961,609 | B2 | 6/2011 | Teague et al. |
| 2001/0046266 | A1 | 11/2001 | Rakib et al. |
| 2002/0001293 | A1 | 1/2002 | Kim |
| 2002/0055360 | A1 | 5/2002 | Chen et al. |
| 2002/0191632 | A1* | 12/2002 | McDermott ......... H04B 1/7075 370/441 |
| 2003/0021245 | A1 | 1/2003 | Haumonte et al. |
| 2007/0183515 | A1 | 8/2007 | Lim et al. |
| 2007/0189205 | A1 | 8/2007 | Terry et al. |
| 2007/0201350 | A1 | 8/2007 | Papasakellariou |
| 2007/0280166 | A1 | 12/2007 | Jung et al. |
| 2008/0075184 | A1* | 3/2008 | Muharemovic ....... H04L 1/1854 375/260 |
| 2008/0186862 | A1 | 8/2008 | Corbett et al. |
| 2008/0192847 | A1 | 8/2008 | Classon et al. |
| 2009/0022098 | A1 | 1/2009 | Novak et al. |
| 2009/0034465 | A1 | 2/2009 | Papasakellariou et al. |
| 2009/0067391 | A1* | 3/2009 | Shen ..................... H04L 1/0027 370/336 |
| 2009/0073922 | A1* | 3/2009 | Malladi ................ H04L 1/0004 370/328 |
| 2009/0201826 | A1 | 8/2009 | Gorokhov et al. |
| 2009/0201873 | A1* | 8/2009 | Korhonen ........... H04W 74/008 370/329 |
| 2009/0209261 | A1 | 8/2009 | Kuri et al. |
| 2010/0034152 | A1* | 2/2010 | Imamura ............... H04L 5/0007 370/329 |
| 2010/0115358 | A1 | 5/2010 | Kotecha et al. |
| 2010/0135222 | A1 | 6/2010 | Arnott |
| 2010/0142455 | A1 | 6/2010 | Imamura |
| 2010/0157913 | A1 | 6/2010 | Negate et al. |
| 2010/0260164 | A1 | 10/2010 | Moon et al. |
| 2010/0290419 | A1 | 11/2010 | Wengerter |
| 2010/0290544 | A1 | 11/2010 | Kawamura et al. |
| 2011/0216723 | A1 | 9/2011 | Sartori et al. |
| 2012/0063409 | A1 | 3/2012 | Novak et al. |
| 2012/0147778 | A1 | 6/2012 | Ishii et al. |
| 2012/0300740 | A1 | 11/2012 | Iwai et al. |

FOREIGN PATENT DOCUMENTS

| | | |
|---|---|---|
| CN | 101292460 | 10/2008 |
| EP | 1 447 943 | 8/2004 |
| JP | 2008-053858 | 3/2008 |
| JP | 2008-263596 | 10/2008 |
| JP | 2009-525688 | 7/2009 |
| JP | 2011-511506 | 4/2011 |
| KR | 1020080113060 | 12/2008 |
| WO | WO 00/44112 | 7/2000 |
| WO | WO 2007/065272 | 6/2007 |
| WO | WO 2007/103602 | 9/2007 |
| WO | WO 2008/052012 | 5/2008 |
| WO | WO 2008/108226 | 9/2008 |
| WO | WO 2008/115835 | 9/2008 |
| WO | WO 2008/153264 | 12/2008 |
| WO | WO 2011/099283 | 8/2011 |

OTHER PUBLICATIONS

Motorola et al., "Change for DCI Format 1A and 1C for Broadcast Control and Update of DCI Formats", R1-084077, 3GPP TSG-RAN Meeting #54bis, Sep. 29-Oct. 3, 2008, 8 pps.

Qualcomm Europe, "DRS in DVRB Case", R1-083185, 3GPP TSG-RAN Meeting #54, Aug. 18-22, 2008, 2 pages.

European Search Report dated Dec. 19, 2016 issued in counterpart application No. 16190949.4-1857, 9 pages.

NEC Group, "Further Clarifications on Resource Allocation Type 0 and Type 1", R1-082673, 3GPP TSG RAN WG1 #53bis, Jun. 30-Jul. 4, 2008, 5 pages.

LG Electronics, "DCI Formats and Bit Fields for SPS Deactivation", R1-090197, 3GPP TSG RAN WG1#55bis, Jan. 12-Jan. 16, 2008, 3 pages.

3rd Generation Partnership Project; Technical Specification Group Radio Access Network; Evolved Universal Terrestrial Radio Access (E-UTRA); Multiplexing and Channel Coding (Release 8), 3GPP TS 36.212 V8.5.0, Dec. 2008, 12 pages.

3rd Generation Partnership Project; Technical Specification Group Radio Access Network; Evolved Universal Terrestrial Radio Access (E-UTRA); Physical Layer Procedures (Release 8), 3GPP TS 36.213 V8.5.0, Dec. 2008, 18 pages.

Korean Office Action dated Oct. 7, 2015 issued in counterpart application No. 10-2011-7020239, 13 pages.

Japanese Office Action dated Dec. 7, 2015 issued in counterpart application No. 2014-230525, 5 pages.

Philips, NXP, "Downlink Resource Allocation Signalling on PDCCH", R1-080821, 3GPP TSG RAN WG1 Meeting #52, Feb. 15, 2008.

Change Request, "Completion of 36.212 CR47 (R1-083421) for "new" DCI Formats", R1-084013, 3GPP TSG-RAN Meeting #54bis, Oct. 3, 2008.

Qualcomm Europe, "Resource Allocation Header for DL Assignments", R1-080643, 3GPP TSG-RAN WG1 #52, Feb. 15, 2008.

Nokia Siemens Networks, Nokia, "Definition of Bit Mapping for DCI Signalling", R1-083098, 3GPP TSG-RAN Meeting #54, Aug. 18-22, 2008.

Japanese Office Action dated Oct. 14, 2014 issued in counterpart application No. 2014-076863.

Panasonic, "UL Rate Control and Dynamic/Persistent Resource Allocations", 3GPP TSG RAN WG2#60, R2-074862, Nov. 5, 2007.

Philips, NXP Semiconductors, "Control Signalling for Dynamically and Persistently-Scheduled Transmissions in E-UTRA", 3GPP TSG RAN WG1 Meeting #49bis, R1-073135, Jun. 25, 2007.

Motorola, "Non-Contiguous Resource Allocation in Uplink LTE-A", R1-090266, 3GPP TSG RAN1#55bis, Jan. 16, 2009.

Chinese Office Action dated Apr. 29, 2016 issued in counterpart application No. 201310589217.6, 8 pages.

\* cited by examiner

CONTROL SIGNALING FOR TRANSMISSIONS OVER CONTIGUOUS AND NON-CONTIGUOUS FREQUENCY BANDS

PRIORITY

The present application is a Continuation application of U.S. patent application Ser. No. 13/421,192, filed in the U.S. Patent and Trademark Office (USPTO) on Mar. 15, 2012, which is a Continuation application of U.S. patent application Ser. No. 12/697,815, filed in the USPTO on Feb. 1, 2010, now U.S. Pat. No. 8,160,016, issued on Apr. 17, 2012, which claims priority under 35 U.S.C. § 119(e) to U.S. Provisional Application No. 61/148,682, entitled "Control Signaling for Transmissions over Contiguous and Non-Contiguous Frequency Bands", which was filed on Jan. 30, 2009, the contents of which are incorporated herein by reference.

BACKGROUND OF THE INVENTION

1. Field of the Invention

The present invention relates generally to wireless communication systems and, more particularly, to a structure of scheduling assignments for the transmission of data signals.

2. Description of the Art

A communication system consists of a DownLink (DL), supporting the transmission of signals from a base station (Node B) to User Equipments (UEs), and an UpLink (UL), supporting the transmission of signals from UEs to the Node B. A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other terminology.

DL signals consist of data signals, carrying information content, control signals, and Reference Signals (RS), which are also known as pilot signals. The Node B conveys DL data signals through a Physical Downlink Shared CHannel (PDSCH). The UEs convey UL data signals through a Physical Uplink Shared CHannel (PUSCH). The DL control signals may be of a broadcast or a UE-specific nature. Broadcast control signals convey system information to all UEs. UE-specific control signals can be used, among other purposes, to provide, to UEs, Scheduling Assignments (SAs) for PDSCH reception (DL SAs) or PUSCH transmission (UL SAs). SAs are transmitted through a Physical Downlink Control CHannel (PDCCH).

The PDCCH is usually a major part of the total DL overhead and directly impacts the achievable DL system throughput. One method for reducing the PDCCH overhead is to scale the PDCCH size according to its required resources during each Transmission Time Interval (TTI). In 3GPP Long Term Evolution (LTE), where the Node B uses Orthogonal Frequency Division Multiple Access (OFDMA) as the DL transmission method, a Control Channel Format Indicator (CCFI) parameter transmitted through a Physical Control Format Indicator CHannel (PCFICH) indicates the number of Orthogonal Frequency Division Multiplexing (OFDM) symbols occupied by the PDCCH.

A structure for the PDCCH and PDSCH transmission in the DL TTI is shown in FIG. 1. The DL TTI is assumed to consist of a single sub-frame 110 having M OFDM symbols. A PDCCH 120 occupies the first N OFDM symbols and a PDSCH 130 occupies the remaining M-N OFDM symbols. A PCFICH 140 is transmitted in some sub-carriers, also referred to as Resource Elements (REs), of the first OFDM symbol. Some OFDM symbols may contain RS REs, 150 and 160, for each of the Node B transmitter antennas. In FIG. 1, it is assumed that there are two Node B transmitter antennas. Among the main purposes of the RS are to enable a UE to obtain an estimate for the DL channel medium it experiences and to perform other measurements and functions as they are known in the art. Additional control channels may be transmitted in the PDCCH region but, for brevity, they are not shown in FIG. 1. For example, assuming the use of Hybrid Automatic Repeat reQuest (HARQ) for PUSCH transmissions, a Physical Hybrid-HARQ Indicator CHannel (PHICH) may be transmitted by the Node B to indicate to UEs whether their previous PUSCH transmissions were correctly or incorrectly received by the Node B.

The Node B separately encodes and transmits each of the UL SAs and DL SAs in the PDCCH. An SA encoding process is illustrated in FIG. 2. The DL SA or UL SA information bits 210, respectively conveying the information scheduling PDSCH reception or PUSCH transmission by a UE, are appended with Cyclic Redundancy Check (CRC) bits in step 220, and are subsequently encoded in step 230, for example using a convolutional code. The bits are rate matched to the assigned PDCCH resources in step 240, and transmitted in step 250. As a consequence, each UE may perform multiple decoding operations to determine whether it is assigned a DL SA or an UL SA in the corresponding sub-frame. Typically, the CRC of each SA is scrambled with an IDentity (ID) of the UE the SA is intended for. After descrambling using its ID, a UE can determine whether an SA is intended for the UE by performing a CRC check.

At the UE receiver, the inverse operations are performed to decode an SA as illustrated in FIG. 3. The received SA 310, is rate de-matched in step 320, decoded in step 330, and after the CRC is extracted in step 340, the SA information bits are obtained in step 350. As previously described, if the CRC check passes, the SA is considered to be intended for the UE.

A structure for the PUSCH transmission in the UL TTI, which is assumed to consist of one sub-frame, is shown in FIG. 4. Single-Carrier Frequency Division Multiple Access (SC-FDMA) is assumed to be the transmission method. A sub-frame 410 includes two slots. Each slot 420 includes seven symbols used for the transmission of data or control signals. Each symbol 430 further includes a Cyclic Prefix (CP) to mitigate interference due to channel propagation effects. PUSCH transmission in one slot may be in the same or different part of the operating BandWidth (BW) than the PUSCH transmission in the other slot. PUSCH transmission in different BWs in each slot is referred to as Frequency Hopping (FH). Some symbols in each slot may be used for RS transmission 440 to provide channel estimation and to enable coherent demodulation of the received signal. The transmission BW is assumed to consist of frequency resource units, which are referred to as Physical Resource Blocks (PRBs). Each PRB is further assumed to consist of $N_{sc}^{RB}$ REs, and a UE is allocated $M_{PUSCH}$ consecutive PRBs 450 for its PUSCH transmission.

A conventional UL SA is described through an set of Information Elements (IEs) in Table 1. Additional IEs or a different number of bits for the indicative IEs in Table 1 may apply. The order of the IEs in a UL SA can be arbitrary. The length of the CRC (UE ID) is assumed to be 16 bits but other values, such as 20 bits or 24 bits, may be used instead.

TABLE 1

IEs of an UL SA for PUSCH Transmission in Contiguous PRBs

| Information Element | Number of Bits | Comment |
| --- | --- | --- |
| Indication of UL SA | 1 | Indicates that the SA is for UL Transmission |
| Resource Allocation (RA) | 11 | Assignment of Consecutive PRBs (total 50 PRBs) |
| Modulation and Coding Scheme (MCS) | 5 | MCS Levels |
| New Data Indicator (NDI) | 1 | New Data Indicator (synchronous HARQ) |
| Transmission Power Control (TPC) | 2 | Power control commands |
| Cyclic Shift Indicator (CSI) | 3 | SDMA (maximum of 8 UEs) |
| Frequency Hopping (FH) | 1 | Frequency Hopping (Yes/No) |
| Channel Quality Indicator (CQI) Request | 1 | Include CQI report (Yes/No) |
| Unused Bit | 1 | To align the UL SA size with a DL SA size |
| CRC (UE ID) | 16 | UE ID masked in the CRC |
| TOTAL | 42 | |

The first IE differentiates the UL SA from an SA used for a different purpose, such as, for example, for PDSCH scheduling (DL SA). The UL SA and the DL SA are desired to have the same size in order for both SAs to be examined with a single decoding operation at the UE.

The second IE is a Resource Allocation (RA) IE, which specifies the assigned PRBs for PUSCH transmission. With SC-FDMA, the signal transmission BW is contiguous. For an operating BW of $N_{RB}^{UL}$ PRBs, the number of possible contiguous PRB allocations to a UE is 1+2+ . . . +$N_{RB}^{UL}$=$N_{RB}^{UL}(N_{RB}^{UL}+1)/2$ and can be signaled with ($\lceil \log_2(N_{RB}^{UL}(N_{RB}^{UL}+1)/2) \rceil$) bits, where $\lceil \ \rceil$ denotes the "ceiling" operation which rounds a number towards its next higher integer. Therefore, for an operating BW of $N_{RB}^{UL}$=50 PRBs assumed in Table 1, the number of required bits is 11. In general, regardless of the transmission method, the UL SA is assumed to contain an RA IE.

The third IE indicates a Modulation and Coding Scheme (MCS) for the PUSCH transmission. With 5 bits, a total of 32 MCS values can be supported. For example, the modulation may be QPSK, QAM16, or QAM64, while the coding rate may take discrete values between, for example, 1/16 and 1. Some values of the MCS IE may be reserved to be used in support of HARQ. For example, the last 3 of the 32 MCS values may be used to indicate a Redundancy Version (RV) for a packet retransmission for the same Transport Block (TB). In that case, the MCS is determined from the MCS of the previous SA for the same TB, which is assumed to be specified with one of the first 29 MCS values.

The fourth IE is a New Data Indicator (NDI). The NDI is set to 1 if a new TB should be transmitted, while it is set to 0 if the same TB, as in a previous transmission, should be transmitted by the UE (synchronous HARQ is assumed).

The fifth IE provides a Transmission Power Control (TPC) command for power adjustments of the PUSCH transmission. For example, the 2 bits of the TPC IE in the UL SA, [00, 01, 10, 11], may respectively correspond to [−1, 0, 1, 3] deciBel (dB) adjustments of the PUSCH transmission power.

The sixth IE is a Cyclic Shift (CS) Indicator (CSI) enabling the use of a different CS for a Constant Amplitude Zero Auto-Correlation (CAZAC) sequence assumed to be used for RS transmission in FIG. 4. The different CS of a CAZAC sequence, adequately separated in time, can result in orthogonal CAZAC sequences. This property can be used to orthogonally multiplex the RS transmission from different UEs in the same PRBs, in order to support Spatial Division Multiple Access (SDMA) for PUSCH transmissions.

The seventh IE indicates whether the UE should apply FH to its PUSCH transmission. For example, if the FH IE value is set to 1, the UE applies FH to its PUSCH transmission as previously explained and described in greater detail below.

The eighth IE indicates whether the UE should include a Channel Quality Indicator (CQI) report in its PUSCH transmission. The CQI report provides the Node B with information about channel conditions the UE experiences in the DL. This information can enable the Node B to select parameters for PDSCH transmission to that UE, such as the MCS and PRBs, so that a performance metric, such as the system throughput or the UE throughput, is improved.

The ninth IE is an unused bit, set to a predetermined value such as 0, which is assumed to be needed to pad the UL SA size in order to make it equal to the size of a DL SA.

The transmission mode for the UL SA described in Table 1 corresponds to PUSCH transmission from a single UE antenna or to antenna transmission diversity. A different UL SA can be defined for a transmission mode corresponding to PUSCH transmission from a UE using a Multiple Input Multiple Output (MIMO) transmission principle.

In an FH operation, a total number of PUSCH PRBs is defined as $N_{RB}^{PUSCH}=N_{RB}^{UL}-N_{RB}^{HO}$ and the parameter "PUSCH-HoppingOffset" is defined as $N_{RB}^{HO}$, which is provided to the UEs by higher layers. The PUSCH transmission in the first slot is at the PRBs specified by the RA IE in the UL SA, and the PUSCH transmission in the second slot is at an equal number of PRBs whose starting point is obtained by adding $\lfloor N_{RB}^{PUSCH}/2 \rfloor$ to the starting point of the PRBs in the first slot, where $\lfloor \ \rfloor$ is the "floor" operation which rounds a number to its immediately lower integer. The FH operation is illustrated in FIG. 5 where $N_{RB}^{UL}$=50 PRBs 510, $N_{RB}^{HO}$=10 PRBs 520, which are equally divided on each side of the BW, and $N_{RB}^{PUSCH}$=40 PRBs 530. A total of 5 PRBs 540 are allocated to the PUSCH transmission by a UE starting from PRB 11 550 in the first slot and PRB number 31 560 in the second slot. Several other realizations of the FH operation are also possible.

In addition to SC-FDMA, where the signal transmission is over a contiguous BW (single cluster of consecutive PRBs with RA IE as described in Table 1), the same transmitter and receiver structure can be used for signal transmission over multiple clusters (non-contiguous sets of PRBs). Because a Discrete Fourier Transform (DFT) is applied to the signal transmission, this method is known as DFT-Spread-OFDM (DFT-S-OFDM). For a single cluster, DFT-S-OFDM is identical to SC-FDMA. For a number of clusters equal to the number of REs in the operating BW, DFT-S-OFDM becomes identical to conventional OFDM.

A block diagram of the transmitter functions for clustered OFDM signaling is illustrated in FIG. 6. Encoded data bits 610 are applied to a DFT 620, RE mapping 630 for the assigned transmission BW are selected through control of localized Frequency Division Multiple Access (FDMA) 640 (zeros are mapped to non-selected REs). Inverse Fast Fourier Transform (IFFT) 650 and CP insertion is performed, time windowing filtering 670 is applied and the signal 680 is transmitted. Additional transmitter circuitry such as a digital-to-analog converter, analog filters, and transmitter antennas are not shown. Also, the encoding and modulation process for the data bits is omitted. The selected REs after the DFT may be in a single cluster of contiguous REs 690 or they may be in multiple clusters of contiguous REs 695.

At the receiver, the reverse (complementary) transmitter operations are performed as illustrated in FIG. 7. After an antenna receives a Radio-Frequency (RF) analog signal and after further processing units (such as filters, amplifiers, frequency down-converters, and analog-to-digital converters) which are not shown, digital signal 710 is filtered at time windowing 720 and continues through CP removal 730. Subsequently, the receiver unit applies an FFT 740, demaps the REs 760 used by the transmitter through control of the reception bandwidth 750 (zeros are appended for the remaining REs), applies an Inverse DFT (IDFT) 770 and obtains received coded data bits 780. Well known receiver functionalities such as channel estimation, demodulation, and decoding are not shown.

There are several issues associated with the design of the control signaling required for supporting contiguous PRB allocations in conjunction with the control signaling required for supporting non-contiguous PRB allocations for a given transmission mode.

A first issue is to avoid introducing different UL SA sizes depending on the number of clusters specified by the RA IE in the UL SA. Assuming that the remaining IEs, as described in Table 1, remain unchanged, different RA IE sizes for addressing a different number of PRB clusters will lead to different UL SA sizes. Since a UE cannot know in advance the number of its allocated PRB clusters, it will have to decode each UL SA corresponding to each possible RA size. This will lead to an increase in the number of decoding operations the UE needs to perform and a respective increase in the PDCCH decoding complexity. For example, if allocations of one cluster of PRBs and allocations of two clusters of PRBs are supported, with each requiring a different UL SA size, the number of decoding operations for the UL SAs is doubled relative to their respective number when only allocation of one cluster of PRBs is supported.

A second issue is that by allowing a large number for clusters of PRBs to be allocated, the respective size of the RA IE in the UL SA may substantially increase, thereby leading to an increase in the total UL SA size and an increase in the associated PDCCH overhead.

Therefore, there is a need to support control signaling for scheduling PUSCH transmissions over non-contiguous PRB allocations by limiting the number of PRB clusters addressable in the RA IE of the respective UL SA.

There is another need to avoid increasing the number of decoding operations associated with UL SAs supporting PUSCH transmissions over non-contiguous PRB allocations.

Finally, there is another need to maintain a small UL SA size for supporting PUSCH transmissions over non-contiguous PRB allocations to avoid increasing the PDCCH overhead.

SUMMARY OF THE INVENTION

The present invention has been made to address at least the above problems and/or disadvantages and to provide at least the advantages described below. Accordingly, an aspect of the present invention provides methods and apparatus for the transmission of a data signal with a certain transmission mode by a UE over a contiguous bandwidth or over multiple non-contiguous clusters with each cluster having a contiguous bandwidth.

According to an aspect of the present invention, a communication method between a UE and a Node B in a communication system is provided. The UE receives a control signal including one bit of frequency hopping information, a resource allocation type, a resource allocation, and a cyclic shift for a reference signal from the Node B. It is determined that the frequency hopping information is used as a part of resource allocation information, if the resource allocation type indicates that two sets of resource blocks are allocated. The UE transmits data based on the frequency hopping information, the resource allocation type, and the resource allocation included in the control signal. Each of the resource blocks comprises one or more resource block groups, and a size of each resource block group is determined based on an uplink bandwidth.

According to another aspect of the present invention, an apparatus of a UE is provided for transmitting data to a Node B in a communication system. The apparatus includes a receiver configured to receive a control signal including one bit of frequency hopping information, a resource allocation type, a resource allocation, and a cyclic shift for a reference signal from the Node B. The apparatus also includes a controller configured to determine that the frequency hopping information is used as a part of resource allocation information, if the resource allocation type indicates that two sets of resource blocks are allocated. The apparatus further includes a transmitter configured to transmit data based on the frequency hopping information, the resource allocation type, and the resource allocation included in the control signal. Each of the resource blocks comprises one or more resource block groups, and a size of each resource block group is determined based on an uplink bandwidth.

According to another aspect of the present invention, a communication method between a UE and a Node B in a communication system is provided. One bit of frequency hopping information, a resource allocation type, a resource allocation, and a cyclic shift for a reference signal are determined. The Node B transmits a control signal including the frequency hopping information, the resource allocation type, the resource allocation, and the cyclic shift, to the UE. The frequency hopping information is determined to be used as a part of resource allocation information, if the resource allocation type indicates that two sets of resource blocks are allocated. Each of the resource blocks comprises one or more resource block groups, and a size of each resource block group is determined based on an uplink bandwidth.

According to another aspect of the present invention, an apparatus of a Node B is provided for receiving data from a UE in a communication system. The apparatus includes a controller configured to determine one bit of frequency hopping information, a resource allocation type, a resource allocation, and a cyclic shift for a reference signal. The apparatus also includes a transmitter configured to transmit a control signal including the frequency hopping information, the resource allocation type, the resource allocation, and the cyclic shift, to the UE. The frequency hopping information is determined to be used as a part of resource allocation information, if the resource allocation type indicates that two sets of resource blocks are allocated. Each of the resource blocks comprises one or more resource block groups, and a size of each resource block group is determined based on an uplink bandwidth

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
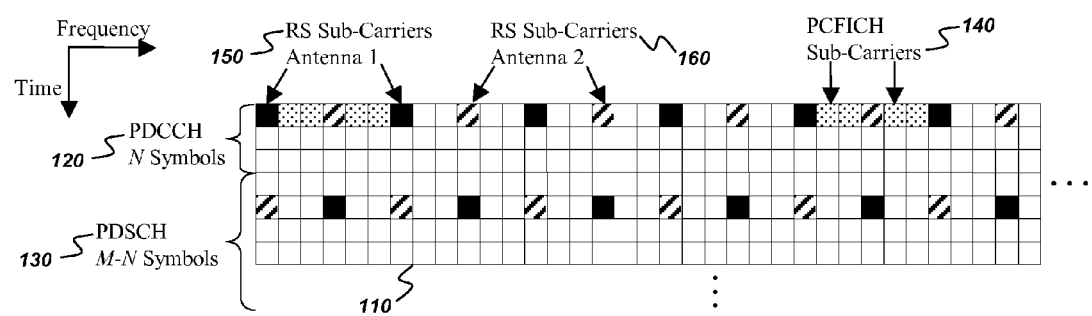
FIG. 1 is a diagram illustrating a DL sub-frame structure for PDCCH and PDSCH transmissions in the DL of the communication system.
Figure 2:
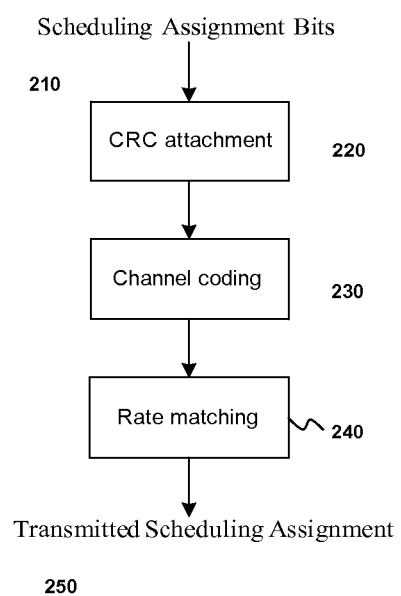
FIG. 2 is a block diagram illustrating an encoding process for a scheduling assignment.
Figure 3:
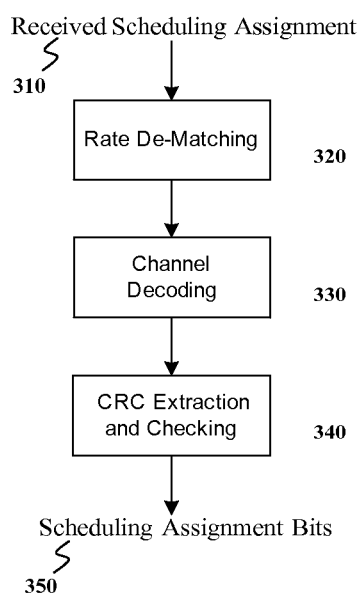
FIG. 3 is a block diagram illustrating a decoding process for a scheduling assignment.
Figure 4:
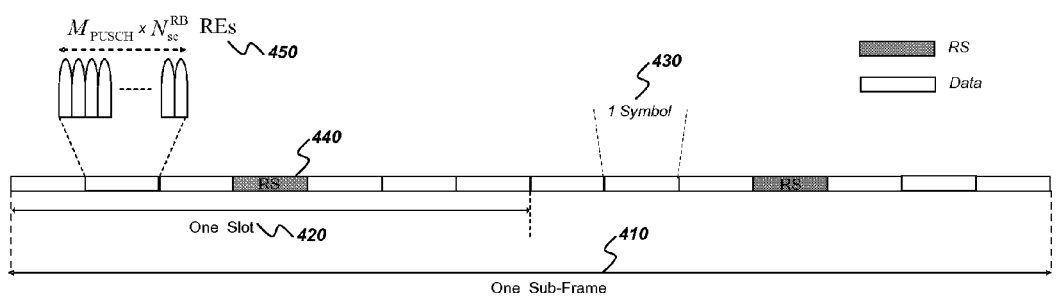
FIG. 4 is a diagram illustrating a UL sub-frame structure.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Additionally, although the present invention is described in relation to an OFDMA communication system, it also applies to all Frequency Division Multiplexing (FDM) systems in general and to SC-FDMA, OFDM, Frequency Division Multiple Access (FDMA), DFT-S-OFDM, DFT-Spread OFDMA, SC-OFDMA, and SC-OFDM in particular.

The invention considers that the same UL SA is used for contiguous PRB allocations and for non-contiguous PRB allocations. In an embodiment of the present invention, the number of PRB clusters addressable by the UL SA is limited to one (contiguous PRB allocations) and two (non-contiguous PRB allocations).

The UE can be semi-statically or dynamically informed as to whether the PUSCH transmission is in contiguous PRBs or in non-contiguous PRBs by the Node B. Semi-static configuration of the PUSCH transmission structure can be through higher layer signaling, such as Radio Resource Control (RRC) signaling. Dynamic configuration can be through the UL SA.

An embodiment of the present invention considers that enabling the use of the same UL SA for addressing contiguous and non-contiguous PRB allocations is based on the following principles:

a) The unused bit in the UL SA described in Table 1 is utilized to indicate whether the RA is for contiguous PRB allocations (for example, a value of 0) or for non-contiguous PRB allocations (for example, a value of 1). In the following description, this bit is assumed to correspond to a "RA indication" IE. This is applicable for dynamic configuration of the PUSCH transmission structure. Otherwise, for RRC configuration, the unused bit in the UL SA described in Table 1 may remain unutilized.

b) FH may not be applicable for non-contiguous PRB allocations. Then, the corresponding 1 bit in the FH IE may be utilized to supplement the existing RA IE in the UL SA or it may be utilized for other purposes.

c) When the "RA Indication" IE is for non-contiguous PRB allocations:
   a. The RA IE also includes the 1 bit from the FH IE.
   b. The addressable PRBs may include only the $N_{RB-PUSCH}$ PRBs and not the $N_{RB}^{UL}$ PRBs.
   c. The addressable PRBs may be grouped in RB Groups (RBGs) of G>1 PRBs.
   d. Half of the bits of the RA IE may be used to address the first PRB cluster and the remaining half may be used to address the second PRB cluster. If the number of bits R in the RA IE is not even, then $\lceil R/2 \rceil$ bits address the first PRB cluster and $\lfloor R/2 \rfloor$ bits address the second PRB cluster.
   e. The PRBs of the first cluster start from the lowest frequency (lowest numbered PRB) and are indexed in an ascending order while the PRBs of the second cluster start from the highest frequency (highest numbered PRB) and are indexed in a descending order.

FH for non-contiguous PRB allocations is not supported because the additional diversity gain is negligible compared to that achieved with FH for contiguous PRB allocations together with multiple transmission or reception antennas.

The interpretation of the UL SA IEs described in Table 1 with non-contiguous PRB allocations is described in Table 2. In this embodiment of the present invention, the FH bit is included to supplement the RA IE, as FH is not supported, and a value of 1 for the unused bit, which is now the "RA Indication" IE (in case of dynamic configuration), is considered as valid.

TABLE 2

IEs of an UL SA for PUSCH Transmission in 2 PRBs Clusters

| Information IE | Number of Bits | Comment |
| --- | --- | --- |
| Indication of UL SA | 1 | May indicate that the SA is for UL Transmission |
| Resource Allocation (RA) | 11 + 1 = 12 | Assignment of Consecutive PRBs (total 50 PRBs) |
| Modulation and Coding Scheme (MCS) | 5 | MCS Levels |
| New Data Indicator (NDI) | 1 | New Data Indicator (synchronous HARQ) |
| Transmission Power Control (TPC) | 2 | Power control commands |
| Cyclic Shift Indicator (CSI) | 3 | SDMA (maximum of 8 UEs) |
| Frequency Hopping (FH) | N/A | Frequency Hopping (Yes/No) |
| Channel Quality Indicator (CQI) Request | 1 | Include CQI report (Yes/No) |
| RA Indication Bit | 1 | Value of 1 indicates 2 PRB Clusters |
| CRC (UE ID) | 16 | UE ID masked in the CRC |
| TOTAL | 42 | |

Figure 8:
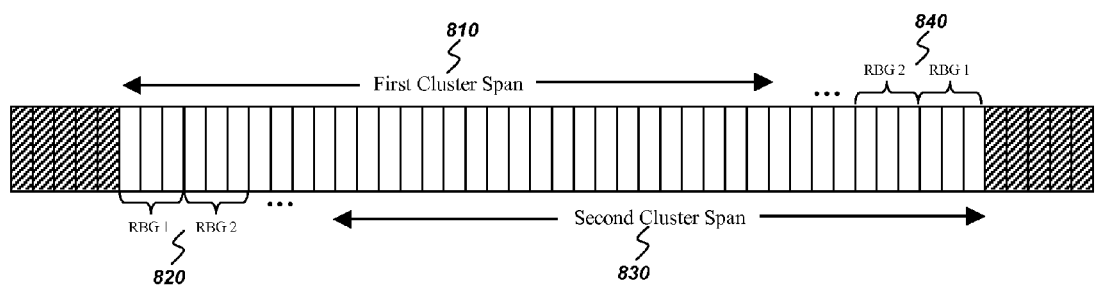
FIG. 8 is a diagram illustrating a resource allocation mapping for DFT-S-FDMA signal transmission in two non-contiguous clusters of contiguous bandwidth, according to an embodiment of the present invention.

As previously described for dynamic configuration, when the RA indication bit is 1, half of the bits of the RA IE are interpreted as indicating the contiguous PRBs for the first cluster and the remaining half are interpreted as indicating the contiguous PRBs for the second cluster. Moreover, the PRBs are allocated in groups of G PRBs. Using the setup of FIG. 5 as reference, the RA principle of this embodiment of the present invention for 2 clusters is illustrated in FIG. 8. A first cluster 810 begins from the lowest $N_{RB}^{PUSCH}$ PRBs, which are grouped into RBG 1, RBG 2, etc. 820, with each RBG having G=3 PRBs. A second cluster 830 begins from the highest $N_{RB}^{PUSCH}$ PRBs, which are also grouped into the respective RBG 1, RBG 2, etc. 840, with each RBG again having G=3 PRBs.

The interpretation of the RA IE for non-contiguous PRB allocations over two clusters is subsequently described for an embodiment of the present invention considering the RA IE size of 12 bits in Table 2. The first 6 bits are used to address RBGs in the first cluster and the second 6 bits are used to address RBGs in the second cluster. With 6 bits, the total number of contiguous RBGs that can be addressed is 10. Therefore, for G=3 PRBs per RBG, the first 30 and the last 30 of the PRBs can be respectively addressed in the first cluster and in the second cluster.

Figure 5:
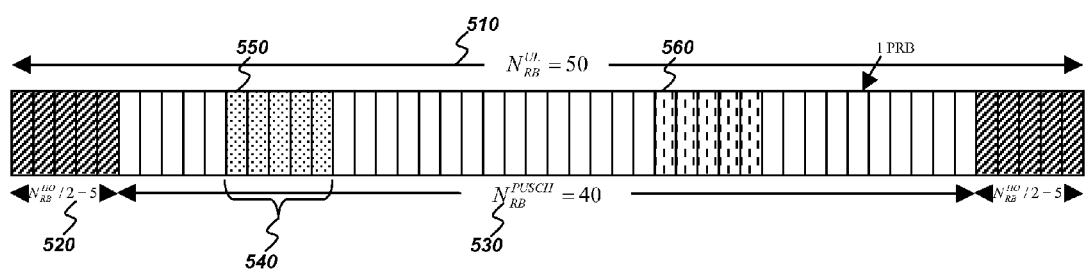
FIG. 5 is a diagram illustrating the application of the frequency hopping operation for data signal transmission in the UL of the communication system.
Figure 6:
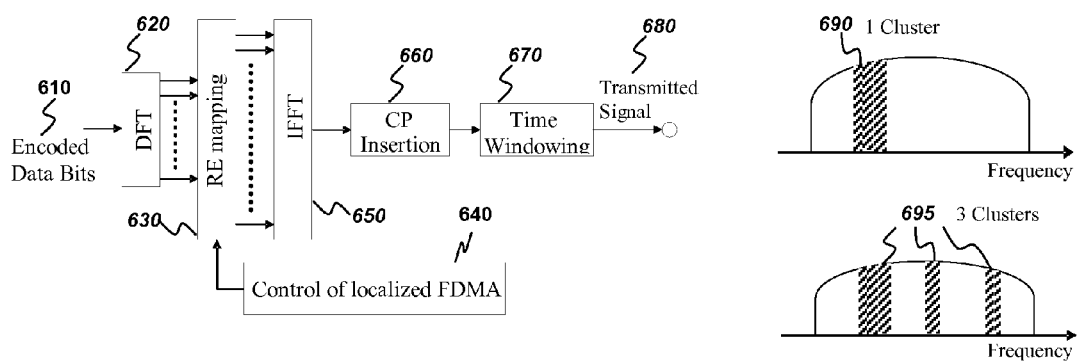
FIG. 6 is a block diagram illustrating a DFT-S-FDMA transmitter.
Figure 7:
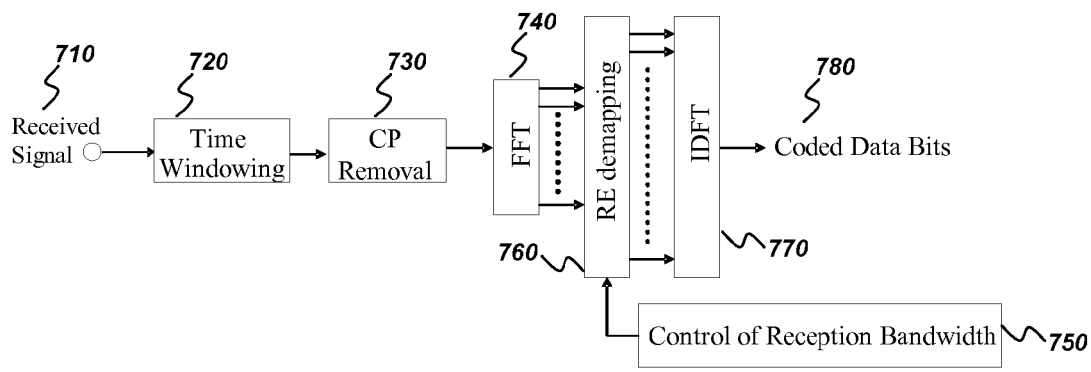
FIG. 7 is a block diagram illustrating a DFT-S-FDMA receiver.
Figure 9:
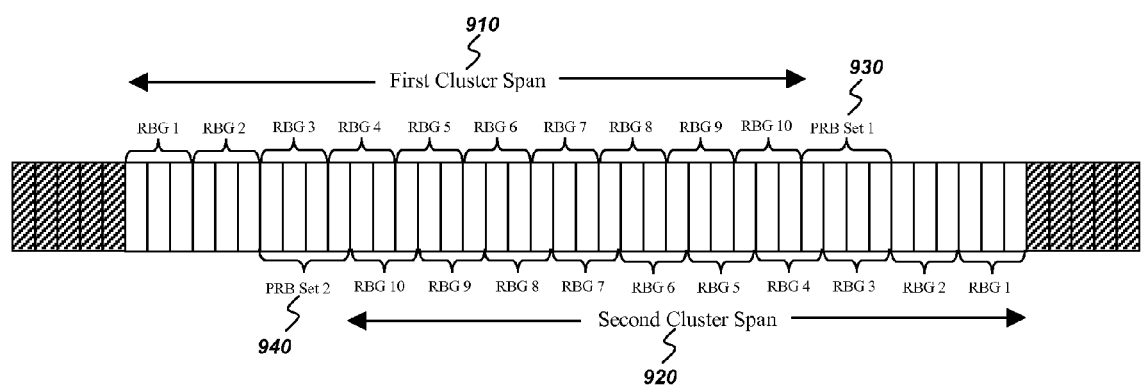
FIG. 9 is a diagram illustrating a first addressing method of resource block groups for the resource allocation mapping for DFT-S-FDMA signal transmission in two non-contiguous clusters of contiguous bandwidth, according to an embodiment of the present invention.

FIG. 9 illustrates the addressable RBGs in each cluster for the setup in FIG. 5, according to an embodiment of the present invention. A first cluster 910 consists of the first 30 $N_{RB}^{PUSCH}$ PRBs, starting from the lowest one, resulting in 10 RBGs. A second cluster 920 consists of the last 30 $N_{RB}^{PUSCH}$ PRBs, again resulting in 10 RBGs. The number of bits in the RA IE to address the RBGs in each cluster may not be sufficiently enough to capture each PRB of the $N_{RB}^{PUSCH}$ PRBs. However, the occurrence of scheduling decisions that cannot be achieved due to non-addressable PRBs is rare. For the setup in FIG. 9, "PRB Set 1" 930 includes non-addressable PRBs, but this occurs only when the second cluster consists of only RBG 1. Similarly, "PRB Set 2" 940 consists of non-addressable PRBs, but this occurs only when the first cluster consists of only RBG 1. These occurrences are highly non-typical and have a negligible impact on the average user throughput and on the average cell throughput of the communication system.

The RBG size of the first cluster may also be different than the RBG size of the second cluster. For example, the first cluster may use G=3 PRBs per RBG while the second cluster may use G=2 PRBs per RBG. The tradeoff from having a smaller RBG size for the second cluster is the increased RA granularity at the expense of a reduced range of captured PRBs by the RA IE. However, this reduced range is not important given that the cluster with the larger RBG size can practically address the entire BW.

Figure 10:
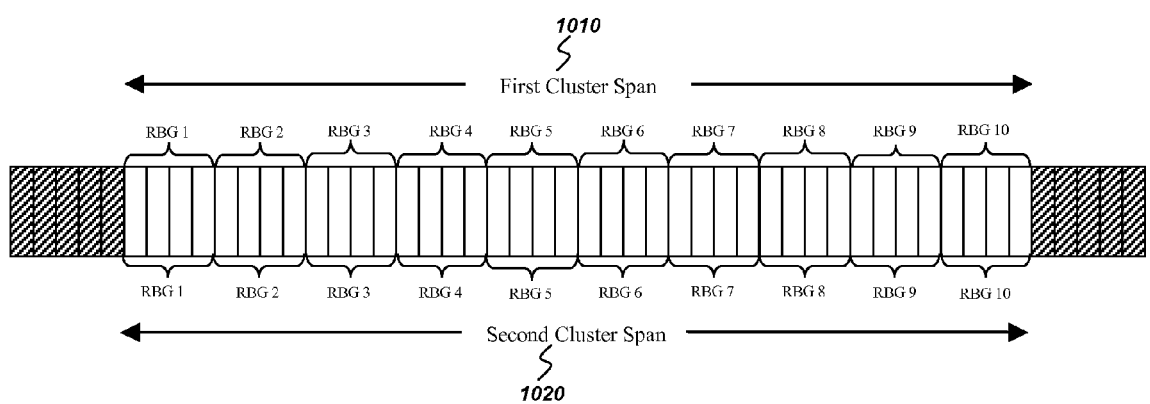
FIG. 10 is a diagram illustrating a second method for addressing resource block groups over the PUSCH hopping bandwidth for the resource allocation mapping for DFT-S-FDMA signal transmission in two non-contiguous clusters of contiguous bandwidth, according to an embodiment of the present invention.
Figure 11:
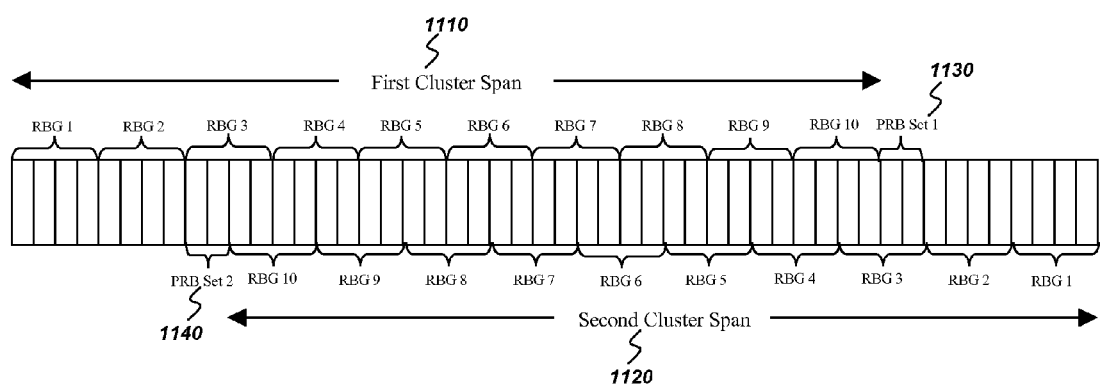
FIG. 11 is a diagram illustrating the second method for addressing resource block groups over the operating bandwidth for the resource allocation mapping for DFT-S-FDMA signal transmission in two non-contiguous clusters of contiguous bandwidth, according to an embodiment of the present invention.

To avoid having non-addressable PRBs, such as "PRB Set 1" in FIG. 9, the RBG size may be increased. For example, for the setup in FIG. 9, by increasing the RBG size to G=4 PRBs per RBG, the first 40 and the last 40 of the $N_{RB}^{PUSCH}$ PRBs can be respectively addressed in the first cluster and in the second cluster as shown according to an embodiment of the present invention in FIG. 10. Both a first cluster 1010 and a second cluster 1020 span all $N_{RB}^{PUSCH}$ PRBs. Another aspect in FIG. 10 is the numbering of the RBGs for the second cluster, which, in general, can begin from the same BW side as the one for the first cluster. The full overlap of the first and second clusters in FIG. 10 is only a coincidence of the assumed $N_{RB}^{HO}$ value and full overlapping is not expected in general. This concept is illustrated according to an embodiment of the present invention in FIG. 11, where the value of $N_{RB}^{HO}$ may be interpreted as being equal to zero.

In order to provide scheduling capability over the entire operating BW of $N_{RB}^{UL}$ PRBs, which also corresponds to the case of $N_{RB}^{HO}=0$, a first cluster 1110 may start from the leftmost (bottom) side of the operating BW and a second cluster 1120 may start from the rightmost (top) side of the operating BW, as shown in FIG. 11, where it is again assumed that the RBG size is G=4 PRBs. Whether the RA IE addresses PRBs over the entire operating BW of $N_{RB}^{UL}$ PRBs or over only the $N_{RB}^{PUSCH}$ PRBs may be predetermined or informed to the UEs through 1 bit in a broadcast channel. The first cluster 1110 and the second cluster 1120 span 40 PRBs and they partially overlap. The non-addressable PRBs, "PRB Set 1" 1130 and "PRB Set 2" 1140 consist of only 2 PRBs and the probability of occurrence is negligible. For example, "PRB Set 1" requires scheduling of the first cluster only in the first RBG, that the second RBG is not scheduled, and the second cluster needs to address the PRBs in "PRB Set 1".

Figure 12:
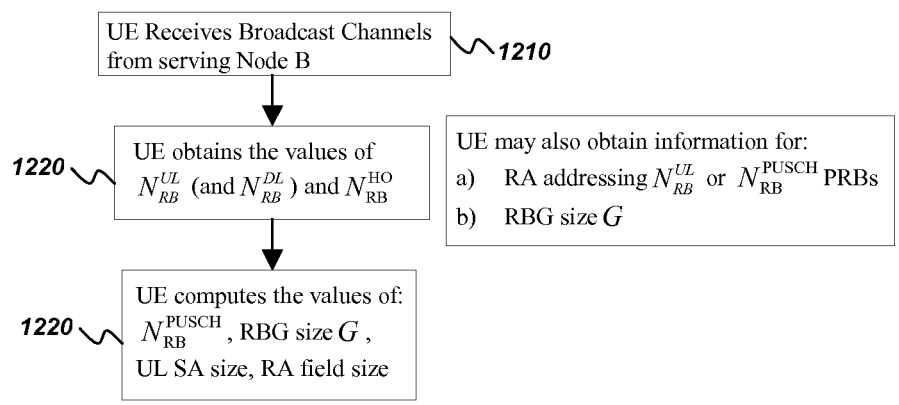
FIG. 12 is a block diagram illustrating the overall UE procedure for processing an UL scheduling assignment, according to an embodiment of the present invention.

The overall UE procedure for processing a UL SA is described in FIG. 12, according to an embodiment of the present invention. The UE first receives broadcast channels in step 1210, transmitted from the Node B, which inform the UE of the $N_{RB}^{UL}$ value (UL operating bandwidth), and of the $N_{RB}^{HO}$ value in step 1220. The UE can then compute the $N_{RB}^{PUSCH}$ value as $N_{RB}^{PUSCH}=N_{RB}^{UL}-N_{RB}^{HO}$ and the remaining parameters required to receive an UL SA in step 1230. A broadcast channel may also provide the RBG size G, or this size can be linked to the value of $N_{RB}^{UL}$. For example, for $N_{RB}^{UL}$ of 25, 50, or 100 PRBs, the RBG size may be predetermined to be G=2, G=3, or G=4, respectively. The UL SA size, and therefore the size of the RA IE in the UL SA since ($\lceil \log_2(N_{RB}^{UL}(N_{RB}^{UL}+1)/2) \rceil$) bits are needed to address contiguous allocations in a total of $N_{RB}^{UL}$ PRBs, is also linked to the value of $N_{RB}^{UL}$ (or to the value of $N_{RB}^{DL}$ corresponding to the DL operating BW which may be obtained from a broadcast channel prior to the UL operating BW). For example, for $N_{RB}^{UL}$ of 25, 50, or 100 PRBs, the size of the RA IE is 9, 11, or 13 bits, respectively, in case of a single cluster. For PUSCH transmission over 2 clusters, the RA size may be supplemented with the 1 bit from the FH IE. For example, for $N_{RB}^{UL}$ of 25, 50, or 100 PRBs, and PUSCH transmission over two clusters, the size of the RA IE is 10, 12, or 14 bits, respectively, with half of these bits allocated to the first cluster and half allocated to the second cluster. A broadcast channel may also inform the UE whether the PRB allocation in the RA IE of the UL SA is for PUSCH transmissions over $N_{RB}^{UL}$ PRBs (the entire UL operating BW) or over only $N_{RB}^{PUSCH}$ PRBs; otherwise, the selected option can be included in the specifications for the system operation.

Figure 13:
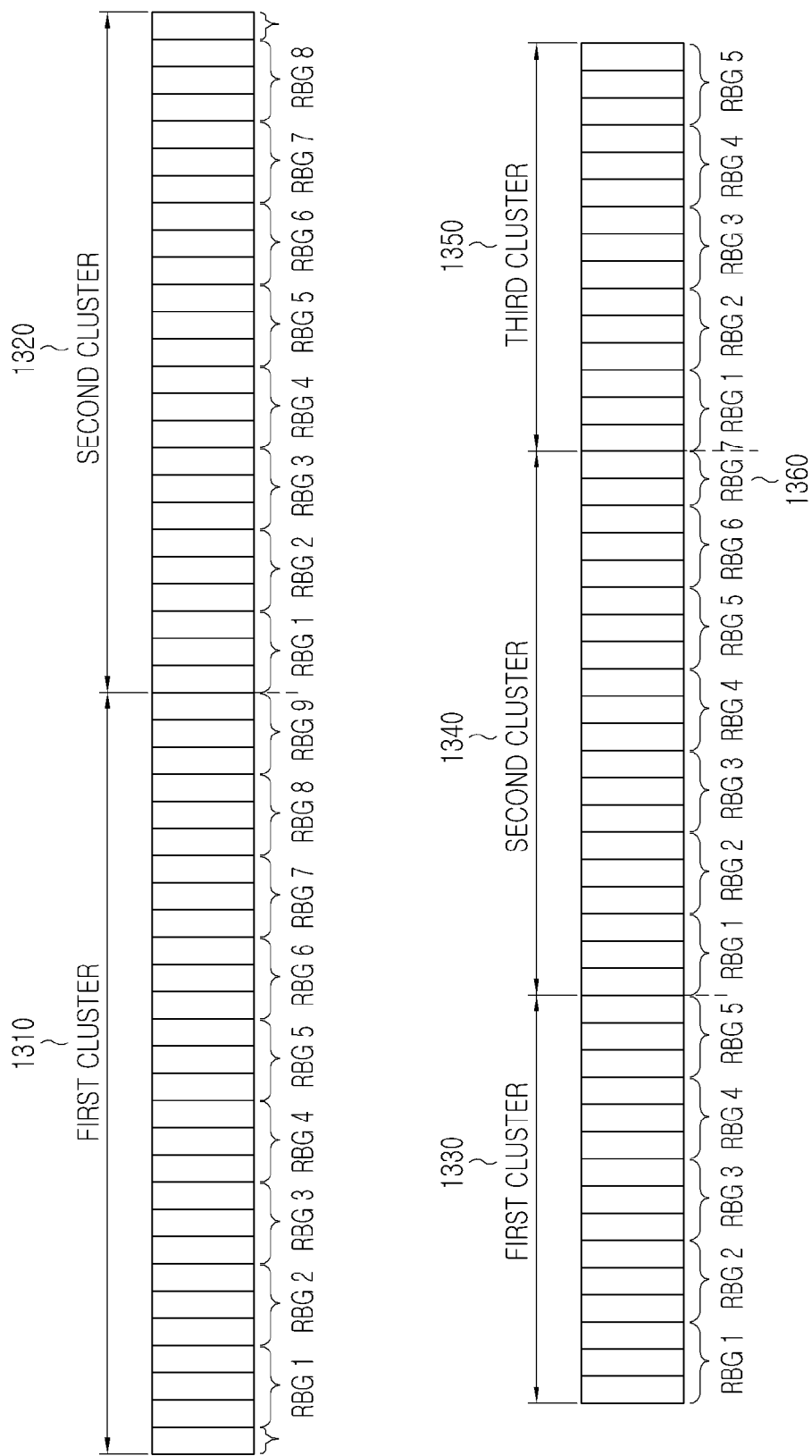
FIG. 13 is a diagram illustrating the division of the UL bandwidth into a number of non-overlapping frequency bands with each band constituting a separately addressable cluster, according to an embodiment of the present invention.

The embodiments of the present invention also consider that the UL BW can be divided into a number of non-overlapping bands with each band constituting a separately addressable cluster. The UL BW may consist of all $N_{RB}^{UL}$ PRBs or it may consist of only the $N_{RB}^{PUSCH}$ PRBs. FIG. 13 illustrates this principle, according to an embodiment of the present invention, where all $N_{RB}^{UL}$=50 PRBs are considered and are divided into $N_{cl}$=2 or $N_{cl}$=3 separately addressable clusters. For $N_{cl}$=2, a first 1310 and a second 1320 cluster have equal sizes and each consist of 8 RBGs and 1 PRB for a total of 9 elements. For $N_{cl}$=3, a first 1330, second 1340, and third 1350 cluster may have different sizes corresponding to a different number of RBGs per cluster. Additionally, as for $N_{cl}$=2, a few RBGs, such as for example RBG 7 1360 in the second cluster 1340, may contain fewer PRBs than the remaining RBGs if the total number of PRBs cannot be equally divided into an integer number of RBGs of equal size.

The interpretation of the UL SA IEs described in Table 1 in case of non-contiguous PRB allocations is described in Table 3. As this UL SA assigns only non-contiguous PRB allocations and has a different size than the UL SA for contiguous only PRB allocations, there is no need to have an IE to discriminate between the two UL SAs, even in the case of dynamic configuration for each of the two PUSCH transmission structures.

TABLE 3

IEs of an UL SA for PUSCH Transmission in two or three PRBs Clusters.

| Information IE | Number of Bits | Comment |
| --- | --- | --- |
| Cluster Number Indicator (CNI) | 1 | Indicates number of PUSCH Clusters (2 or 3) |
| Resource Allocation (RA) | 13 | Assignment of Consecutive PRBs (total 50 PRBs) |
| Modulation and Coding Scheme (MCS) | 5 | MCS Levels |
| New Data Indicator (NDI) | 1 | New Data Indicator (synchronous HARQ) |
| Transmission Power Control (TPC) | 2 | Power control commands |
| Cyclic Shift Indicator (CSI) | 3 | SDMA (maximum of 8 UEs) |
| Frequency Hopping (FH) | 1 | Frequency Hopping (Yes/No) |
| Channel Quality Indicator (CQI) Request | 1 | Include CQI report (Yes/No) |
| CRC (UE ID) | 16 | UE ID masked in the CRC |
| TOTAL | 43 | |

The difference of the UL SA in Table 3 relative to the UL SA in Table 1 is in the following IEs:

a) Cluster Number Indicator (CNI): This IE is unique to the UL SA in Table 3 and indicates the number of clusters for the scheduled PUSCH transmission and its value determined the interpretation of the RA IE.

b) RA: Depending on the CNI value, the RA IE addresses two or three clusters. If the CNI indicates two clusters, the number of RA bits is divided into two parts with an equal number of bits if the RA size is an even number.

Otherwise, the first part has one more bit than the second part. If the CNI indicates three clusters, the number of RA bits is divided into three parts with an equal number of bits if the RA size is a multiple of three. Otherwise, the middle part has one more (or one less) bit than the first and third parts.

For example, for $N_{RB}^{UL}$=50 PRBs and an RBG size of G=3 PRBs, 12 bits are required for two clusters (six bits per cluster), with each cluster consisting of eight RBGs and one PRB for a total of nine addressable elements, and 13 bits are required for three clusters (four bits for the first and third clusters and five bits for the second cluster) as shown in FIG. 13. Therefore, the RA IE requires 13 bits and for two clusters, one of these bits is set to a predetermined value such as 0.

Figure 14:
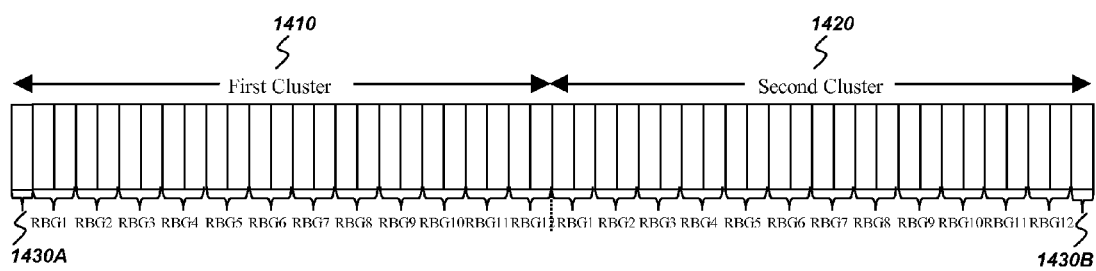
FIG. 14 is a diagram illustrating the adaptation of the resource block group size used as the bandwidth unit for data signal transmission on the number of assigned clusters, according to an embodiment of the present invention.

An alternative embodiment of the present invention considers that the RBG size depends on the number of assigned clusters. For example, a smaller RBG size can be assigned to a smaller number of clusters. This is illustrated in FIG. 14, according to an embodiment of the present invention, where for two clusters the RBG size is G=2. For three clusters, the RBG size is G=3. Both a first cluster 1410 and a second cluster 1420 consist of 12 RBGs and one PRB 1430A, 1430B. The number of bits required for the allocation in each cluster is seven, resulting to a total of 14 RA bits for addressing both clusters.

Figure 15:
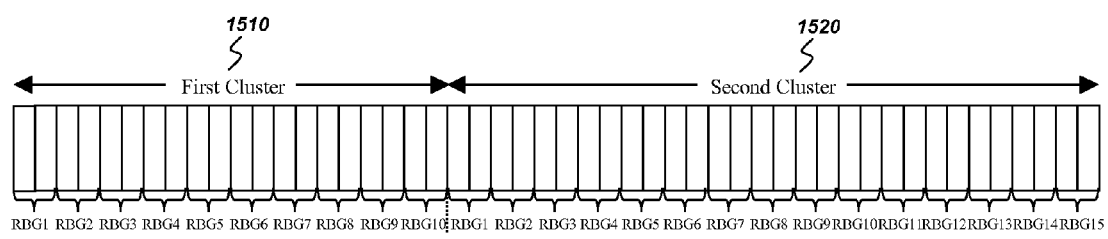
FIG. 15 is a diagram illustrating a partitioning of the resource block groups in order to obtain the same number of bits for specifying the resource allocation when the partitioning of the scheduling bandwidth is over two or three clusters, according to an embodiment of the present invention.

In order to obtain the same number of bits for the RA IE when the partitioning of the scheduling BW is over two and three clusters, an alternative partitioning of the RBGs in the two clusters is illustrated in FIG. 15, according to an embodiment of the present invention. This partitioning maximizes the utilization of the number of bits in each of the two parts of the RA IE in order to address as many as possible elements in each part. Since a maximum of 10 contiguously allocated elements can be addressed with six bits and a maximum of 15 contiguously allocated elements can be addressed with seven bits, the partitioning in FIG. 15 considers that a first cluster 1510 consists of 10 RBGs and a second cluster 1520 consist of 15 RBGs. The total number of RA bits is 13, which is the same as the one for three clusters and RBG size of G=3 illustrated in FIG. 13.

While the invention has been shown and described with reference to certain embodiments thereof, it will be understood by those skilled in the art that various changes in form and detail may be made therein without departing from the spirit and scope of the present invention as defined by the appended claims.

What is claimed is:

1. A communication method between a user equipment (UE) and a Node B in a communication system, the communication method comprising:
   receiving, by the UE, a control signal including one bit of frequency hopping information, a resource allocation type, a resource allocation, and a cyclic shift for a reference signal from the Node B;
   determining that the frequency hopping information is used as a part of resource allocation information, in response to the resource allocation type indicating that two sets of resource blocks are allocated; and
   transmitting, by the UE, data based on the frequency hopping information, the resource allocation type, and the resource allocation included in the control signal,
   wherein each set of the resource blocks comprises one or more consecutive resource block groups each having a size that is determined based on an uplink bandwidth.

2. The communication method of claim 1, wherein the frequency hopping information is used as a frequency hopping flag indicating whether frequency hopping is applied, in response to the resource allocation type indicating that one set of resource blocks is allocated.

3. An apparatus of a user equipment (UE) for transmitting data to a Node B in a communication system, the apparatus comprising:
- a receiver configured to receive a control signal including one bit of frequency hopping information, a resource allocation type, a resource allocation, and a cyclic shift for a reference signal from the Node B; and
- a controller configured to determine that the frequency hopping information is used as a part of resource allocation information, in response to the resource allocation type indicating that two sets of resource blocks are allocated; and
- a transmitter configured to transmit data based on the frequency hopping information, the resource allocation type, and the resource allocation included in the control signal,
- wherein each set of the resource blocks comprises one or more consecutive resource block groups each having a size that is determined based on an uplink bandwidth.

4. The apparatus of claim 3, wherein the frequency hopping information is used as a frequency hopping flag indicating whether frequency hopping is applied, in response to the resource allocation type indicating that one set of resource blocks is allocated.

5. A communication method between a user equipment (UE) and a Node B in a communication system, the communication method comprising:
- determining one bit of frequency hopping information, a resource allocation type, a resource allocation, and a cyclic shift for a reference signal; and
- transmitting, by the Node B, a control signal including the frequency hopping information, the resource allocation type, the resource allocation, and the cyclic shift, to the UE,
- wherein the frequency hopping information is determined to be used as a part of resource allocation information, in response to the resource allocation type indicating that two sets of resource blocks are allocated, and
- wherein each set of the resource blocks comprises one or more consecutive resource block groups each having a size that is determined based on an uplink bandwidth.

6. The communication method of claim 5, wherein the frequency hopping information is used as a frequency hopping flag indicating whether frequency hopping is applied, in response to the resource allocation type indicating that one set of resource blocks is allocated.

7. An apparatus of a Node B for receiving data from a user equipment (UE) in a communication system, the apparatus comprising:
- a controller configured to determine one bit of frequency hopping information, a resource allocation type, a resource allocation, and a cyclic shift for a reference signal; and
- a transmitter configured to transmit a control signal including the frequency hopping information, the resource allocation type, the resource allocation, and the cyclic shift, to the UE,
- wherein the frequency hopping information is determined to be used as a part of resource allocation information, in response to the resource allocation type indicating that two sets of resource blocks are allocated, and
- wherein each set of the resource blocks comprises one or more consecutive resource block groups each a size that is determined based on an uplink bandwidth.

8. The apparatus of claim 7, wherein the frequency hopping information is used as a frequency hopping flag indicating whether frequency hopping is applied, in response to the resource allocation type indicating that one set of resource blocks is allocated.

* * * * *